Figure 1:
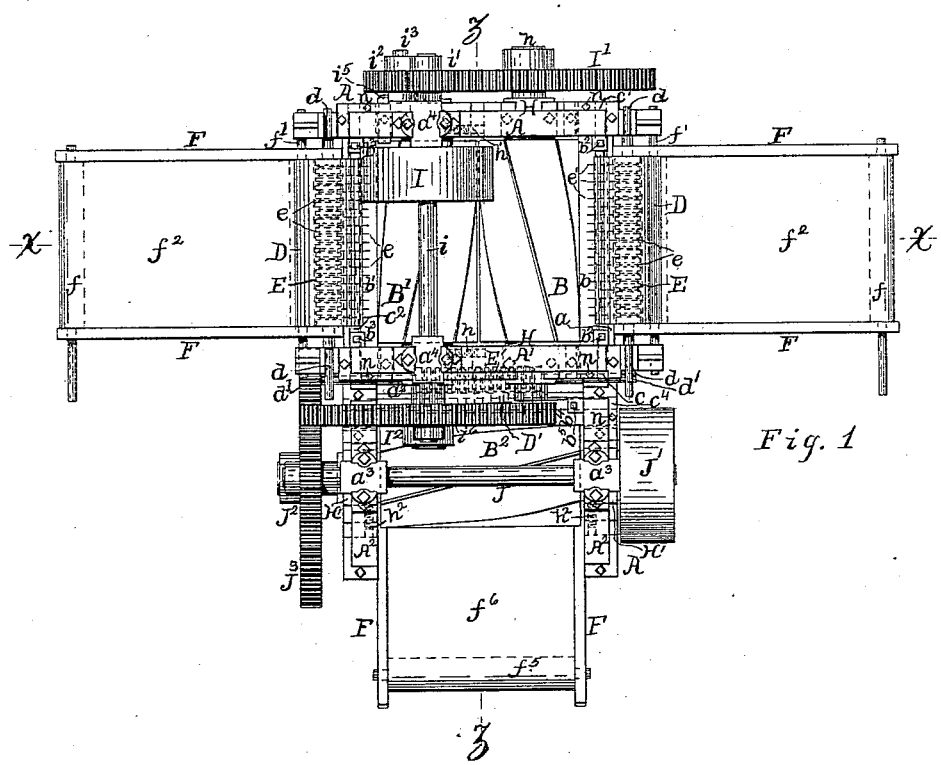

(No Model.) 2 Sheets—Sheet 1.

A. A. COBURN.
MACHINE FOR CUTTING RAGS, &c.

No. 359,846. Patented Mar. 22, 1887.

Witnesses
George W. Tegg
Herbert H. Barton

Inventor
Azro A. Coburn
By Chas H. Burleigh
Attorney (No Model.) 2 Sheets—Sheet 2.

A. A. COBURN.
MACHINE FOR CUTTING RAGS, &c.

No. 359,846. Patented Mar. 22, 1887.

Witnesses
George W. Tripp
Herbert P. Barton

Inventor
Azro A. Coburn
By Chas. H. Burleigh
Attorney

United States Patent Office.

AZRO A. COBURN, OF HOLYOKE, MASSACHUSETTS, ASSIGNOR TO THE COBURN-TAYLOR MANUFACTURING COMPANY, OF SAME PLACE.

MACHINE FOR CUTTING RAGS, &c.

SPECIFICATION forming part of Letters Patent No. 359,846, dated March 22, 1887.

Application filed August 14, 1885. Serial No. 174,448. (No model.)

*To all whom it may concern:*

Be it known that I, AZRO A. COBURN, a citizen of the United States, residing at Holyoke, in the county of Hampden and State of Massachusetts, have invented certain new and useful Improvements in Machines for Cutting Rags and Paper-Stock, and for other Purposes; and I declare the following to be a description of my said invention sufficiently full, clear, and exact to enable others skilled in the art to which it appertains to make and use the same, reference being had to the accompanying drawings, which form a part of this specification.

The object of my present invention is to provide a rag-cutting machine that will cut rags in a better, more rapid, and economical manner than the machines heretofore in use—one which will give a smooth shear-cut in both directions across the rags, thereby producing less dust and lint than in the ordinary machines; also to provide a rag-cutting machine having double-feed aprons, or facilities for being conveniently fed by two operators. These objects I attain by mechanism the nature, construction, and operation of which are illustrated in the drawings and explained in the following description, the particular subject-matter claimed being hereinafter definitely specified.

Figure 4:
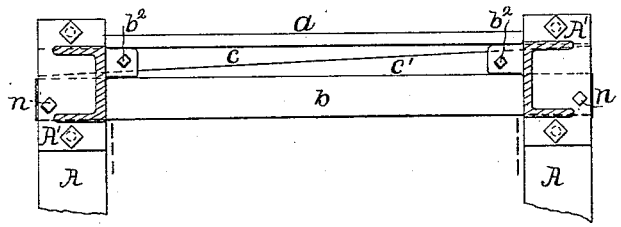
Figure 5:
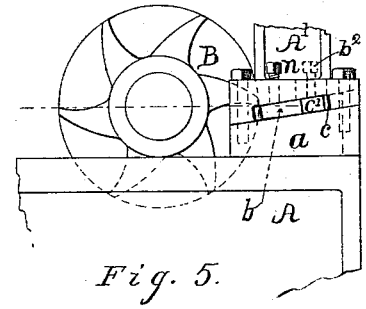
Figure 2:
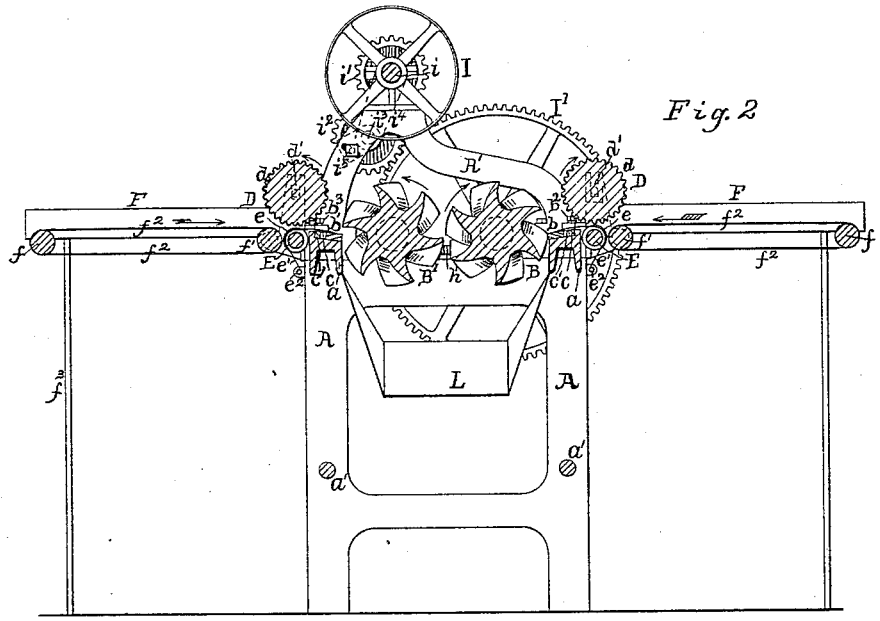
Figure 3:
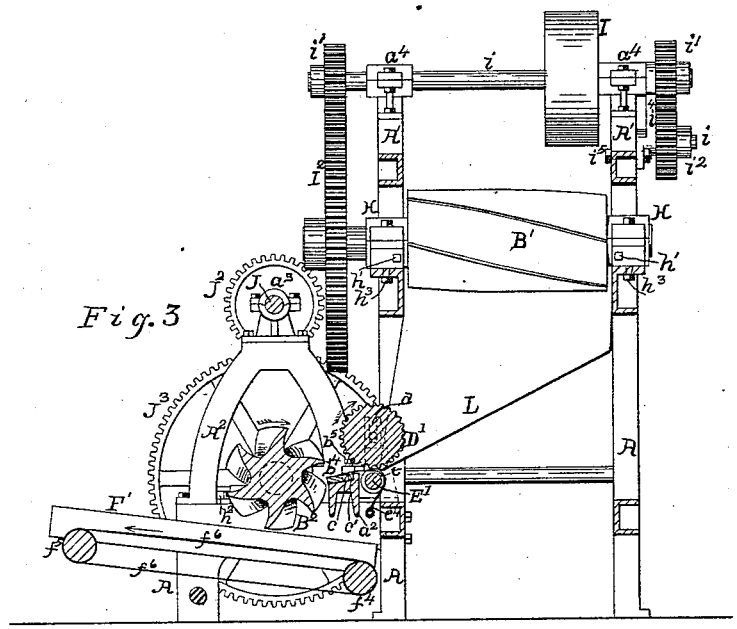

In the drawings, Figure 1 is a plan view of a machine illustrating my invention. Fig. 2 is a vertical section at line $xx$, Fig. 1. Fig. 3 is a vertical section at line $zz$, Fig. 1. Fig. 4 is a top view of the stationary cutter or bed-knife. Fig. 5 shows an end detail of the cutting mechanism.

My improved rag-cutting machine comprises duplicate sets of cutting devices oppositely arranged and mounted on the frame closely adjacent to each other, with feeding mechanism and delivery-aprons for facilitating the simultaneous feeding of stock thereto from right and left, and a secondary single set of feeding and cutting devices arranged for automatically receiving and crosscutting the stock as it comes from said primary double set of cutting devices, the relative arrangement, construction, and operation of the mechanism being substantially as illustrated and as more fully hereinafter explained.

In referring to parts, A denotes the main frame, upon which are supported the primary feeding and cutting devices, and $A^2$ is the auxiliary frame for supporting the secondary cutting devices at a cross-angle and below said primary cutters.

B B' indicate spiral-knife revolvers or cutter-cylinders, which are mounted on the top of frame A, adjacent to each other, in bearings H, secured to said frame A in a manner to be adjustable thereon, and provided with holding-bolts $h^3$, for retaining them in position. The revolvers are provided with gears I' $I^2$, by which they are revolved from pinions $i'$, that are fixed on an operating-shaft, $i$, mounted to turn in bearings $a^4$ on the top part, A', of the frame, and provided with a pulley, I, for a driving-belt. An intermediate gear, $i^2$, is adjustably arranged between the pinion $i'$ and gear I', so that the cylinders B and B' revolve in opposite directions to each other. The intermediate gear, $i^2$, is mounted on an adjustable stud, $i^3$, so that it can follow the gear $I^2$ as the revolvers and their gearing are adjusted farther apart, to accommodate the wearing away of the cutters.

$B^2$ indicates a similar spiral-knife revolver or cutter-cylinder mounted in bearings H' on the auxiliary frame $A^2$, at a lower level and with its axis standing in a different direction to that of cutters B B'. Said secondary cylinder or revolver is provided with a gear, $J^3$, that meshes with a pinion, $J^2$, on an operating-shaft, J, mounted to turn in bearings $a^3$ on frame $A^2$, and provided with a pulley, J', for the driving-belt. The pulleys J' and I may be operated at similar or different speeds, as required, the facilities therefor being by the well-known expedient of different-sized pulleys on the counter-shaft of the mill. (Not shown.)

The several cutter-cylinders or revolvers B, B', and $B^2$ are preferably cast on a chill, and are made with a series of spirally-disposed blades or stunt-edged knife-flanges, which work in conjunction with straight blades or bed-knives $b$, $b'$, and $b^4$, respectively, to effect the cutting action on the rags by a smooth shearing cut as their angles are moved past each other. Adjusting-screws $h$ are arranged in connection with the journal-boxes H of the revolvers B B' for setting the spiral knives or cutters up to the bed-knives as the shearing edges become worn away. Said screws may extend from the journal-boxes of one of the revolvers to that of the other, so as to brace them apart, if desired, or may be fitted in any suitable manner for moving and adjusting said spiral-knife revolvers to and from their respective bed-knives, which latter are located laterally of the revolvers, at or about the level of their axis.

The bed-knives $b\ b'\ b^4$ consist of plain straight rectangular bars of steel with sharp-ground cutting-edges at all four of their angles, so that the bar can be reversed to bring either angle to working position. These bed-knives are arranged in combination with the spiral-knife revolvers, as indicated in Figs. 4 and 5, the knife-bar being supported throughout its length, parallel with and laterally of the revolver, upon a rigid bed or transom, $a$, and in a slightly-inclined position, so that one of its angles will meet the peripheral circle of the revolver B in a plane parallel with and passing horizontally, or nearly so, through the axis of said revolver, (see dotted line, Fig. 5,) the rear angle of said bar being above said plane, as indicated. The bed-knife is held in place by set-screws $n$, or other suitable clamping mechanism, at its ends, and may be readily detached for sharpening or change of position.

At the back of the bed-knife, between it and a flange on the bed-transom $a$, two oppositely-directed tapered gibs or wedges, C and C', are inserted, which give a solid bearing for the back edge of the bed-knife, and facilitate its forward adjustment by driving in the wedge as it becomes worn away. Set-screws $b^2$ are provided for retaining the wedges $c\ c'$ in place, as indicated in Fig. 4.

D and D' indicate the upper feed-rolls and E the lower feed-rolls for the several cutting devices. The lower rolls, E, are mounted in fixed bearings in their frames and are made with circular grooved faces. Rolls D have their shafts $d$ supported in vertically-slotted bearings $d'$, so as to rise and fall with the inequalities of the stock, and said top rolls are made with longitudinally-grooved faces. In connection with each of the feed devices a guard or series of bent wires or fingers, $e$, are attached to the frame by a bar, $e^2$, beneath the rolls E, which wires pass up in front of said lower roll and extend back over the cutter-bar, thus forming a bridge or guard to prevent the stock from clogging into the space between the feed-roll and the bed-knife.

The arrangement of the feed-rolls for the secondary set of cutting apparatus is substantially similar to that above described, E', and D' being the feed-rolls, $e^3$ the spring-wires, and $e^4$ their support-bar.

F F indicate side frames, extending to the right and left of the machine, carrying rollers $f\ f'$, on which are mounted endless feed-aprons $f^2\ f^2$, for simultaneously delivering rag-stock to the primary feeding and cutting apparatus from both directions, and so as to facilitate two attendants supplying the machine without inconvenience.

The gearing for operating the feed-rolls and endless aprons may be arranged in any suitable and well-known manner for revolving said rolls and advancing said aprons in the direction indicated by the arrows.

F' is the tail-race frame supporting the rolls $f^4\ f^5$, on which is mounted the discharge-apron, which receives the cut rags and conveys them from beneath the machine to any required position.

The secondary cutting apparatus $B^2$ and $b^4$ is arranged at one side and at lower level than the primary cutting apparatus, and preferably at a right angle thereto. The auxiliary frame $A^2$ may be a part of the main frame A, or separate or attached thereto. An inwardly and downwardly inclined guiding hopper or trough, L, is arranged beneath the primary cutters for receiving the stripped rags from said first cutters and conducting them from the feed-rolls E' D' of the secondary cutting apparatus. The form and arrangement of this trough are such that the rags cut in strips by the primary cutting devices follow down to the feed-rolls D' E' in longitudinal directions, and are thereby delivered to the secondary cutters in a manner to effect the severing of the rags transversely or across the direction in which they were cut by the primary cutters.

The rags can be cut in a very rapid and satisfactory manner. The feed-rolls of the secondary cutting apparatus, by being run at a greater speed than the feed of the primary cutter mechanisms, effect the cutting of the rags into short strips or oblong pieces, such as are best adapted for working in the subsequent machines and processes employed in the making of paper.

I do not herein broadly claim, in a rag-cutting machine, a bed-knife which consists of a rectangular plain bar having sharp cutting-edges at its angles, in combination with clamping devices for retaining it in position upon the frame with either of its angles presented to the revolving cutters, irrespective of the construction and arrangement of the mechanism.

I am aware that a primary and a secondary cutting mechanism has heretofore been employed in rag-cutting machines, but not in construction and manner of operation such as herein shown. I am also aware that a spiral-knife revolver has been employed in rag-machines, and I do not, therefore, claim such a cutter otherwise than in the combinations and relations specified.

What I claim as of my invention, and desire to secure by Letters Patent, is—

1. The combination, substantially as hereinbefore described, of the spirally-flanged revolver, the bed-knife laterally disposed in relation thereto and rigidly supported on the frame, the feed-rolls at the back of said bed-knife, and the apron or endless feed-belt, all as illustrated, for the purpose set forth.

2. The combination, substantially as set forth, in a rag-cutting machine, of a spiral-knife revolver, a straight bed-knife supported on a rigid bed having a back rib or support, and a tapered wedge (or wedges) inserted along the back of said bed-knife for sustaining it against the action of said spiral knife, as set forth.

3. The combination, substantially as described, of the bed $a$, having a back flange, the reversible bed-knife supported thereon, the retaining-screws $n$, the tapered adjusting-pieces $c\ c'$, and set-screws, for the purpose set forth.

4. The combination, in a rag-cutting machine, of a spiral-knife revolver, a pair of feeding-rolls, a straight bed-knife disposed in lateral relation between said feed-rolls and revolver, and a series of guard-fingers extending across the space between said feed-rolls and bed-knife, for the purpose set forth.

5. The combination, with the lower feed-roll, E, and bed-knife, of the series of wires or guides $e$, having their lower ends connected to the bar $e^2$ and their upper portion passing over said roll and extending out upon the bed-knife, in the manner and for the purpose set forth.

6. The combination, substantially as described, of the primary cutting mechanisms B $b$ B' $b'$, right and left feed-aprons $f^2 f^3$, feed-rollers E D, guiding-trough L, feed-rolls E' D', secondary cutting mechanism B$^2$ $b^4$, discharge-apron $f^6$, and operating-gearing for imparting motion to said parts, for the purpose set forth.

Witness my hand this 17th day of July, A. D. 1885.

AZRO A. COBURN.

Witnesses:
CHAS. H. BURLEIGH,
GEO. M. RICE, 2d.